United States Patent

[11] 3,562,639

| [72] | Inventors | James B. Wright; |
| | | James D. Holder, Huntsville, Ala. |
| [21] | Appl. No. | 790,141 |
| [22] | Filed | Jan. 9, 1969 |
| [45] | Patented | Feb. 9, 1971 |
| [73] | Assignee | the United States of America, as represented by the Secretary of the Army |

[54] METHOD AND APPARATUS FOR TESTING EXPLODING BRIDGEWIRE ORDNANCE DEVICES
2 Claims, 1 Drawing Fig.

| [52] | U.S. Cl. | 324/51 |
| [51] | Int. Cl. | G01r 31/02 |
| [50] | Field of Search | 324/51– |
| | | —54, 72.5, 73, 133, 115, 122, 62, 21—23, 28; |
| | | 340/250, 252, 256; 323/74, 79—81, 8 |

[56] References Cited
UNITED STATES PATENTS

| 2,036,084 | 3/1936 | Roder | 323/79X |
| 2,862,179 | 11/1958 | Murphy | 324/51 |
| 2,917,705 | 12/1959 | Clough | 324/51 |
| 3,015,790 | 1/1962 | Eisaman et al. | 323/74X |
| 3,135,913 | 6/1964 | Hodgdon | (324/73UX) |
| 3,217,244 | 11/1965 | Glover | 324/54X |
| 3,277,364 | 10/1966 | Abrahamson | 324/51X |

Primary Examiner—Gerard R. Strecker
Attorneys—Harry M. Saragovitz, Edward J. Kelly, Herbert Berl and Aubrey J. Dunn ABSTRACT: A device and method wherein a first potential is applied to an exploding bridgewire unit (EBW), including a spark gap, to determine if the EBW is shorted. If the EBW is shorted, a lamp will be lighted. If the lamp is not lighted a second potential may be applied to the EBW to check continuity of the bridgewire of the EBW. The second potential is high enough to cause the spark gap of the EBW to break down and conduct if continuity of the bridgewire exists. If the lamp does not light the EBW is defective. Current through the EBW is limited to render the possibility of damage to or explosion of the EBW negligible.

PATENTED FEB 9 1971
3,562,639
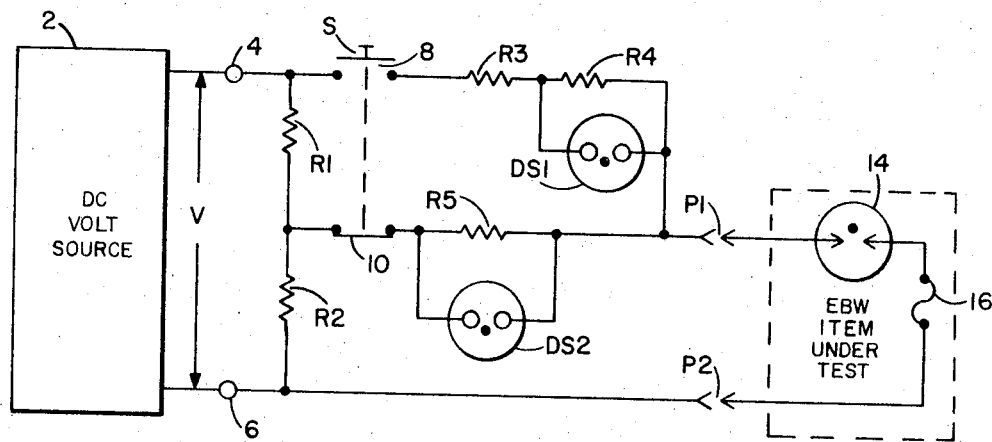
James B. Wright
James D. Holder,
INVENTORS.
BY
Harry M. Saragovitz
Edward J. Kelly
Herbert Berl
Aubrey J. Dunn

METHOD AND APPARATUS FOR TESTING EXPLODING BRIDGEWIRE ORDNANCE DEVICES

CROSS-REFERENCE TO RELATED APPLICATIONS

This application is similar to my copending application, Ser. No. 791,416 filed on Jan. 15, 1969 however, this invention is distinct therefrom. The invention herein is a simpler, more direct approach, requiring fewer components and less space at the sacrifice of expediency.

BACKGROUND OF THE INVENTION

The nondestructive testing of ordnance items has in the past been a dangerous and delicate operation. In latter years the high energy firing systems notably the exploding bridgewire concept, has reduced the physical danger considerably. The EBW unit, a high current, high voltage device uses a series connected spark gap. This spark gap introduces an electrical discontinuity and prevents the use of ohmmeter-style testers. Several testing techniques have been tried with varying degrees of success.

SUMMARY OF THE INVENTION

In the present invention a voltage means in series with a neon lamp is shorted across the EBW. If the lamp lights, the EBW is shorted and therefore faulty. The applied voltage is limited to a value below the breakdown voltage of the spark gap of the EBW. If the lamp does not light, a second voltage, a voltage high enough to cause breakdown of the spark gap, is applied to the EBW. If the bridgewire of the EBW has continuity, the lamp will light.

DESCRIPTION OF THE DRAWING

The single FIG. drawing is a schematic diagram of the invention.

DESCRIPTION OF THE PREFERRED EMBODIMENT

Referring to the drawing, voltage source 2 is connected across terminals 4 and 6. Resistors R1 and R2 comprise a voltage divider network. Switch S has a normally open pole 8 and a normally closed pole 10. Voltage source 2 supplies a voltage high enough to cause the spark gap 12 of the item under test (IUT) to conduct. When contact 10 is closed and the IUT is plugged in at plug P1 and P2, a voltage somewhat less than voltage V is applied to the IUT. If the IUT is shorted a current will flow and light lamp DS2. If lamp DS2 lights, the IUT is faulty and the test is terminated. Should the lamp not light, the IUT is not shorted and the test is continued. Switch S is depressed causing pole 8 to close and pole 10 to open. The full voltage of voltage source 2 is now applied across gap 14 of the IUT. This voltage is sufficient to cause the gap to start conducting and light lamp DS1. The current, is, however, not large enough to effect the IUT. Should lamp DS1 light, it indicates that the spark gap 14 in the IUT has begun conduction and the current is flowing to the return line through the bridgewire 16, thus indicating a good unit. The current flowing through the IUT due to either the first (shorting) test or the second (conducting) test is very small. Resistor R3 limits the current for the conducting test to a value far below the value necessary to activate the bridgewire of the EBW. A small current flowing through resistors R4 or R5 is sufficient to cause lamp DS1 or DS2 respectively to light.

We claim:

1. Apparatus for testing the spark gap of an exploding bridgewire ordnance device for shorts and testing the series connection of the spark gap and bridgewire of an exploding bridgewire ordnance device for continuity comprising:

a first and second output terminal; a DC voltage source having a first and second output terminal;

a first and second lamp;

a first and second resistor connected in series between said first and second output terminal of said voltage source;

at a third and fourth resistor;

means connecting said third resistor between said first output terminal of said voltage source and said first output terminal of said test unit; said means further connecting said fourth resistor from between said first and second resistors and said first output terminal of said test unit;

said first lamp being connected in parallel with said third resistor;

said second lamp being connected in parallel with said fourth resistor;

said second output terminals being connected together; and said exploding bridgewire ordnance device being adapted to be connected between said first and second output terminals of said test unit.

2. Apparatus as set forth in claim 1 wherein said means connecting comprises a switch having a normally open pole and normally closed pole, said normally open pole being connected between said output terminal of said voltage source and said parallel connection of said first lamp and said third resistor; and said normally closed pole being connected from between said first and second resistor and said parallel combination of said second lamp and said fourth resistor.